US008082050B2

(12) United States Patent
Schmidt et al.

(10) Patent No.: US 8,082,050 B2

(45) Date of Patent: Dec. 20, 2011

(54) METHOD AND APPARATUS FOR PROCESSING TWO OR MORE INITIALLY DECODED AUDIO SIGNALS RECEIVED OR REPLAYED FROM A BITSTREAM

(75) Inventors: Jürgen Schmidt, Wunstorf (DE); Jens Spille, Hemmingen (DE); Ernst F. Schröder, Hannover (DE); Johannes Böhm, Göttingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 1398 days.

(21) Appl. No.: 10/536,539

(22) PCT Filed: Nov. 24, 2003

(86) PCT No.: PCT/EP03/13172

§ 371 (c)(1), (2), (4) Date: May 26, 2005

(87) PCT Pub. No.: WO2004/052052

PCT Pub. Date: Jun. 17, 2004

(65) Prior Publication Data

US 2006/0174267 A1 Aug. 3, 2006

(30) Foreign Application Priority Data

Dec. 2, 2002 (EP) .................................... 02026779

(51) Int. Cl.
*G06F 17/00* (2006.01)

(52) U.S. Cl. ......................................................... 700/94

(58) Field of Classification Search ..................... 700/94
See application file for complete search history.

(56) References Cited

U.S. PATENT DOCUMENTS 5,594,800 A * 1/1997 Gerzon .......................... 381/20
5,647,008 A * 7/1997 Farhangi et al. .............. 381/119
(Continued)

FOREIGN PATENT DOCUMENTS

EP 1021044 7/2000
(Continued)

OTHER PUBLICATIONS

Engineer Guidelines the AES/EBU digital audio interface; Copyright 1995.*

(Continued)

*Primary Examiner* — Curtis Kuntz
*Assistant Examiner* — Paul McCord
(74) *Attorney, Agent, or Firm* — Robert D. Shedd; Joseph J. Opalach; Reitseng Lin

(57) ABSTRACT

In the MPEG-4 standard ISO/IEC 14496:2001 several audio objects that can be coded with different MPEG-4 format coding types can together form a composed audio system representing a single soundtrack from the several audio sub-streams. In a receiver the multiple audio objects are decoded separately, but not directly played back to a listener. Instead, transmitted instructions for mixdown are used to prepare a single soundtrack. Mixdown conflicts can occur in case the audio signals to be combined have different channel numbers or configurations. According to the invention an additional audio channel configuration node is used that tags the correct channel configuration information items to the decoded audio data streams to be presented. The invention enables the content provider to set the channel configuration in such a way that the presenter at receiver side can produce a correct channel presentation under all circumstances. An escape code value in the channel configuration data facilitates correct handling of not yet defined channel combinations.

2 Claims, 2 Drawing Sheets

U.S. PATENT DOCUMENTS

Figure 1:
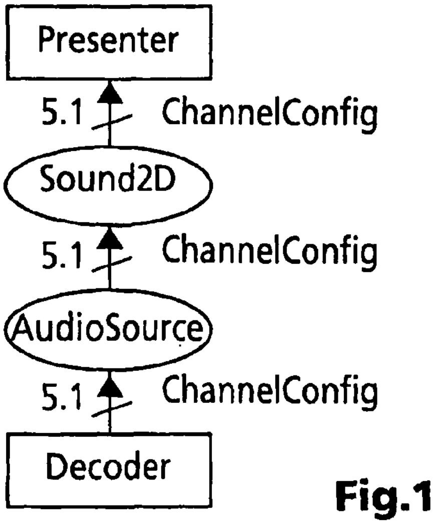

| | | | | |
|---|---|---|---|---|
| 5,701,346 | A * | 12/1997 | Herre et al. | 381/18 |
| 6,119,091 | A * | 9/2000 | Huang et al. | 704/500 |
| 6,141,597 | A * | 10/2000 | Botzko et al. | 700/94 |
| 6,259,957 | B1 * | 7/2001 | Alexander et al. | 700/94 |
| 6,466,833 | B1 * | 10/2002 | Lau | 700/94 |
| 6,629,001 | B1 * | 9/2003 | Vadivelu | 700/94 |
| 6,681,077 | B1 * | 1/2004 | Murase et al. | 386/99 |
| 6,757,302 | B1 * | 6/2004 | Lydon et al. | 370/503 |
| 6,772,127 | B2 * | 8/2004 | Saunders et al. | 704/500 |
| 6,799,208 | B1 * | 9/2004 | Sankaranarayan et al. | 709/223 |
| 6,804,565 | B2 * | 10/2004 | Eid | 700/94 |
| 6,867,820 | B2 * | 3/2005 | Jin | 348/738 |
| 6,931,370 | B1 * | 8/2005 | McDowell | 704/200.1 |
| 7,058,189 | B1 * | 6/2006 | Grimm et al. | 381/119 |
| 7,072,726 | B2 * | 7/2006 | Wilson et al. | 700/94 |
| 7,073,193 | B2 * | 7/2006 | Marsh | 725/114 |
| 7,096,080 | B2 * | 8/2006 | Asada et al. | 700/94 |
| 7,158,843 | B2 * | 1/2007 | Smith | 700/94 |
| 7,212,872 | B1 * | 5/2007 | Smith et al. | 700/94 |
| 7,266,501 | B2 * | 9/2007 | Saunders et al. | 704/500 |
| 7,281,200 | B2 * | 10/2007 | Haskell et al. | 715/201 |
| 7,333,863 | B1 * | 2/2008 | Lydecker et al. | 700/94 |
| 2001/0046199 | A1 * | 11/2001 | McPherson et al. | 369/59.21 |
| 2001/0055398 | A1 * | 12/2001 | Pachet et al. | 381/80 |
| 2002/0016882 | A1 * | 2/2002 | Matsuuchi et al. | 710/305 |
| 2002/0040295 | A1 * | 4/2002 | Saunders et al. | 704/200 |
| 2002/0111959 | A1 * | 8/2002 | Ching et al. | 707/201 |
| 2002/0122559 | A1 * | 9/2002 | Fay et al. | 381/119 |
| 2002/0124097 | A1 * | 9/2002 | Isely et al. | 709/231 |
| 2003/0016747 | A1 * | 1/2003 | Westerink et al. | 375/240.08 |
| 2003/0021429 | A1 * | 1/2003 | Ratcliff et al. | 381/119 |
| 2003/0031260 | A1 * | 2/2003 | Tabatabai et al. | 375/240.25 |
| 2003/0078687 | A1 * | 4/2003 | du Breuil | 700/94 |
| 2003/0093792 | A1 * | 5/2003 | Labeeb et al. | 725/46 |
| 2003/0156108 | A1 * | 8/2003 | Vetro | 345/418 |
| 2003/0177279 | A1 * | 9/2003 | Evans | 709/315 |
| 2004/0024478 | A1 * | 2/2004 | Hans et al. | 700/94 |
| 2004/0083356 | A1 * | 4/2004 | Chatterjee et al. | 713/1 |
| 2004/0111677 | A1 * | 6/2004 | Luken et al. | 715/523 |
| 2006/0292980 | A1 * | 12/2006 | Marcos Alba | 455/3.06 |

FOREIGN PATENT DOCUMENTS

| | | | |
|---|---|---|---|
| JP | 7-162384 | | 6/1995 |
| JP | 8-31096 | | 2/1996 |
| JP | 2001-306081 | A | 11/2001 |
| JP | 2002-44543 | | 2/2002 |
| JP | 2002-232375 | | 8/2002 |
| WO | WO 98/55998 | | 12/1998 |

OTHER PUBLICATIONS

Patent Abstracts of Japan, vol. 1996, No. 06, Jun. 28, 1996 & JP 8-031096 (Matsushita Electric Ind.Co. Ltd).

Patent Abstracts of Japan, vol. 2002, No. 6, Jun. 4, 2002 & JP 2002/044543 (Alpine Electronics Inc.).

Search Report Dated Jun. 2, 2004.

ISO/IEC DIS 13818-3, Second Edition, JTC 1/SC 29 N 1702, Jul. 22, 1996, 1 pg.

ISO/IEC JTC 1/SC 29 N 1702, Coding of Audio, Picture, Multimedia and Hypermedia Information, Aug. 7, 1996, 1 pg.

ISO/IEC DIS 13818-3, Cover Sheet to be provided by the ISO Central Secretariat, 1996, 126 pgs.

ISO/IEC 11172-3. 1993 (E), Title Page Provided by ISO, 1993, 163 pgs.

* cited by examiner

METHOD AND APPARATUS FOR PROCESSING TWO OR MORE INITIALLY DECODED AUDIO SIGNALS RECEIVED OR REPLAYED FROM A BITSTREAM

This application claims the benefit, under 35 U.S.C. §365 of International Application PCT/EP03/13172, filed Nov. 24, 2003, which was published in accordance with PCT Article 21(2) on Jun. 17, 2004 in English and which claims the benefit of European patent application No. 02026779.5, filed Dec. 2, 2002 and European patent application No. 02026779.5, filed Dec. 2, 2002.

The invention relates to a method and to an apparatus for processing two or more initially decoded audio signals received or replayed from a bitstream, that each have a different number of channels and/or different channel configurations, and that are combined before being presented in a final channel configuration.

BACKGROUND

In the MPEG-4 standard ISO/IEC 14496:2001, in particular in part 3 Audio and in part 1 Systems, several audio objects that can be coded with different MPEG-4 format coding types can together form a composed audio system representing a single soundtrack from the several audio substreams. User interaction, terminal capability, and speaker configuration may be used when determining how to produce a single soundtrack from the component objects. Audio composition means mixing multiple individual audio objects to create a single soundtrack, e.g. a single channel or a single stereo pair. A set of instructions for mixdown is transmitted or transferred in the bitstream. In a receiver the multiple audio objects are decoded separately, but not directly played back to a listener. Instead, the transmitted instructions for mixdown are used to prepare a single soundtrack from the decoded audio objects. This final soundtrack is then played for the listener.

ISO/IEC 14496:2001 is the second version of the MPEG-4 Audio standard, whereas ISO/IEC 14496 is the first version. In the above MPEG-4 Audio standard nodes for presenting audio are described. Header streams that contain configuration information, which is necessary for decoding the audio substreams are transported via MPEG-4 Systems. In a simple audio scene the channel configuration of the audio decoder—for example 5.1 multichannel—can be fed inside the Compositor from one node to the following node so that the channel configuration information can reach the presenter, which is responsible for the correct loudspeaker mapping. The presenter represents that final part of the audio chain which is no more under the control of the broadcaster or content provider, e.g. an audio amplifier having volume control and the attached loudspeakers.

'Node' means a processing step or unit used in the above MPEG-4 standard, e.g. an interface carrying out time synchronisation between a decoder and subsequent processing units, or a corresponding interface between the presenter and an upstream processing unit. In general, in ISO/IEC 14496-1:2001 the scene description is represented using a parametric approach. The description consists of an encoded hierarchy or tree of nodes with attributes and other information including event sources and targets. Leaf nodes in this tree correspond to elementary audio-visual data, whereas intermediate nodes group this material to form audio-visual objects, and perform e.g. grouping and transformation on such audio-visual objects (scene description nodes).

Audio decoders either have a predetermined channel configuration by definition, or receive e.g. some configuration information items for setting their channel configuration.

INVENTION

Normally, in an audio processing tree the channel configuration of the audio decoders can be used for the loudspeaker mapping occurring after passing the sound node, see ISO/IEC 14496-3:2001, chapter 1.6.3.4 Channel Configuration. Therefore, as shown in FIG. 1, an MPEG-4 player implementation passes these information items, that are transmitted within a received MPEG-4 bitstream, together with the decoder output or outputs through the audio nodes AudioSource and Sound2D to the presenter. The channel configuration data ChannelConfig is to be used by the presenter to make the correct loudspeaker association, especially in case of multi-channel audio (numchan>1) where the phaseGroup flags in the audio nodes are to be set.

However, when combining or composing audio substreams having different channel assignments, e.g. 5.1 multichannel surround sound and 2.0 stereo, some of the audio nodes (AudioMix, AudioSwitch and AudioFX) defined in the current MPEG-4 standard mentioned above can change the fixed channel assignment that is required for the correct channel representation, i.e. such audio nodes have a channel-variant behaviour leading to conflicts in the channel configuration transmission.

A problem to be solved by the invention is to deal properly with such channel configuration conflicts such that the presenter can replay sound with the correct or the desired channel assignments. This problem is solved by the method disclosed in claim 1. An apparatus that utilises this method is disclosed in claim 3.

The invention discloses different but related ways of solving such channel configuration confusion by using channel-variant audio nodes. An additional audio channel configuration node is used, or its functionality is added to the existing audio mixing and/or switching nodes. This additional audio channel configuration node tags the correct channel configuration information items to the decoded audio data streams that pass through the Sound2D node to the presenter.

Advantageously, the invention enables the content provider or broadcaster to set the channel configuration in such a way that the presenter at receiver side can produce a correct channel presentation under all circumstances. An escape code value in the channel configuration data facilitates correct handling of not yet defined channel combinations even in case signals having different channel configurations are mixed and/or switched together.

The invention can also be used in any other multi-channel application wherein the received channel data are passed through a post processing unit having the inherent ability to interchange the received channels at reproduction.

In principle, the inventive method is suited for processing two or more initially decoded audio signals received or replayed from a bitstream, that each have a different number of channels and/or different channel configurations, and that are combined by mixing and/or switching before being presented in a final channel configuration, wherein to each one of said initially decoded audio signals a corresponding specific channel configuration information is attached, and wherein said mixing and/or switching is controlled such that in case of non-matching number of channels and/or types of channel configurations the number and/or configuration of the channels to be output following said mixing and/or following said switching is determined by related specific mixing and/or switching information provided from a content provider or broadcaster, and wherein to the combined data stream to be presented a correspondingly updated channel configuration information is attached.

In principle the inventive apparatus includes:

at least two audio data decoders that decode audio data received or replayed from a bitstream;

means for processing the audio signals initially decoded by said audio data decoders, wherein at least two of said decoded audio signals each have a different number of channels and/or a different channel configuration, and wherein said processing includes combination by mixing and/or switching;

means for presenting the combined audio signals in a final channel configuration, wherein to each one of said initially decoded audio signals a corresponding specific channel configuration information is attached, wherein in said processing means said mixing and/or switching is controlled such that in case of non-matching number of channels and/or types of channel configurations the number and/or configuration of the channels to be output following said mixing and/or following said switching is determined by related specific mixing and/or switching information provided from a content provider or broadcaster, and wherein to the combined data stream fed to said presenting means a correspondingly updated channel configuration information is attached.

Advantageous additional embodiments of the invention are disclosed in the respective dependent claims.

DRAWINGS

Figure 2:
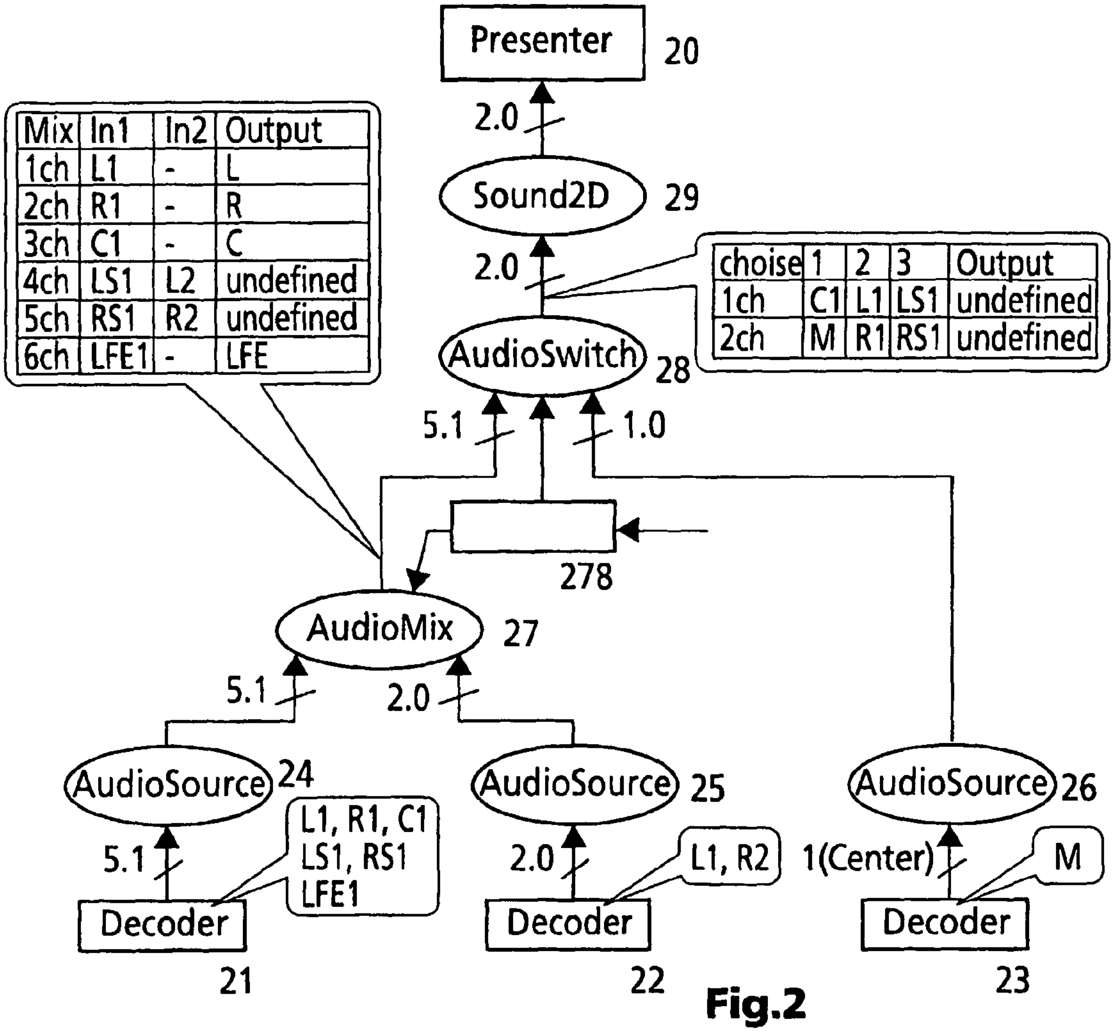
Figure 3:
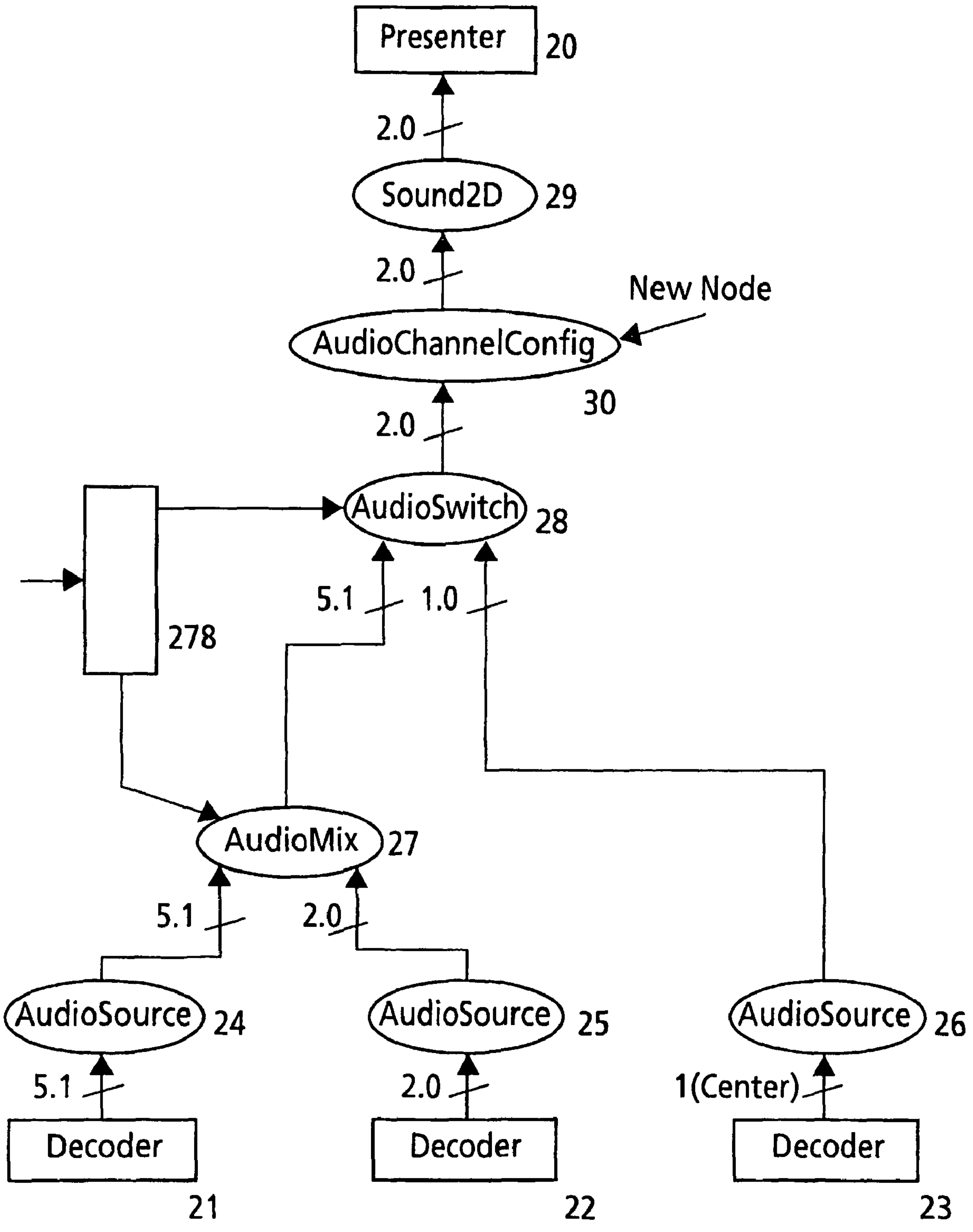

Exemplary embodiments of the invention are described with reference to the accompanying drawings, which show in:

FIG. 1 Transparent channel configuration information flow in a receiver;

FIG. 2 Channel configuration flow conflicts in a receiver;

FIG. 3 Inventive receiver including an additional node AudioChannelConfig.

EXEMPLARY EMBODIMENTS

In FIG. 2 a first decoder 21 provides a decoded '5.1 multichannel' signal via an AudioSource node or interface 24 to a first input In1 of an AudioMix node or mixing stage 27. A second decoder 22 provides a decoded '2.0 stereo' signal via an AudioSource node or interface 25 to a second input In2 of AudioMix node 27. The AudioMix node 27 represents a multichannel switch that allows to connect any input channel or channels to any output channel or channels, whereby the effective amplification factors used thereby can have any value between '0'='off' and '1'='on', e.g. '0.5', '0.6' or '0.707'. The output signal from AudioMix node 27 having a '5.1 multichannel' format is fed to a first input of an AudioSwitch node or switcher or mixing stage 28. A third decoder 23 provides a decoded '1 (centre)' signal via an AudioSource node or interface 26 to a second input of AudioSwitch node 28.

The functionality of this AudioSwitch node 28 is similar to that of the AudioMix node 27, except that the 'amplification factors' used therein can have values '0'='off' or '1'='on' only. AudioMix node 27 and Audio switch node 28 are controlled by a control unit or stage 278 that retrieves and/or evaluates from the bitstream received from a content provider or broadcaster e.g. channel configuration data and other data required in the nodes, and feeds these data items to the nodes. Audio switch node 28 produces or evaluates sequences of switching decisions related to the selection of which input channels are to be passed through as which output audio channels. The corresponding whichChoice data field specifies the corresponding channel selections versus time instants. The audio output signal from AudioSwitch node 28 having a '2.0 stereo' format is passed via a Sound2D node or interface 29 to the input of a presenter or reproduction stage 20.

In FIG. 2 two different conflicts are shown. The first conflict occurs in the mix node 27, where a mix of a stereo signal into the surround channels in a 5.1 configuration is shown. The question is, for example, whether the resulting audio output signal should have 5.1 channels, or the 5.1 surround channels should become 2.0 stereo format channels. In case of selecting a 5.1 output format the straight-forward solution would be to assign input signal L2 to the first output channel 1ch and input signal R2 to the second output channel 2ch. However, there are many other possibilities. The content provider or broadcaster could desire to assign input signal L2 to output channel 4ch and input signal R2 to output channel 5ch instead. However, the current version of the above MPEG-4 standard does not allow such feature.

The second conflict occurs in the sequence of whichChoice data field updates in the AudioSwitch node 28. Within this sequence, channels out of the AudioMix node 27 output and the single channel output from AudioSource node 26 are sequentially selected at specified time instants. The time instants in the whichChoice data field can be defined by e.g. every succeeding frame or group of frames, every predetermined time period (for instance 5 minutes), each time the content provider or broadcaster has preset or commanded, or upon each mouse click of a user. In the example given in FIG. 2, at a first time instant input signal C1 is connected to output channel 1ch and input signal M is connected to output channel 2ch. At a second time instant input signal L1 is connected to output channel 1ch and input signal R1 is connected to output channel 2ch. At a third time instant input signal LS1 is connected to output channel 1ch and input signal RS1 is connected to output channel 2ch. Within this sequence, channels out of the AudioMix node 27 output and the single channel output from AudioSource node 26 are sequentially selected. However, because of the contradictory input information in node 28, no correct output channel configuration can be determined automatically based on the current version of the above MPEG-4 standard.

Based on the assumption that the content provider or broadcaster is to solve such conflicts, three inventive solutions are feasible that are explained in connection with FIG. 3. A first decoder 21 provides a decoded '5.1 multichannel' signal via an AudioSource node or interface 24 to a first input of an AudioMix node or mixing stage 27. A second decoder 22 provides a decoded '2.0 stereo' signal via an AudioSource node or interface 25 to a second input of AudioMix node 27. The output signal from AudioMix node 27 having a '5.1 multichannel' format is fed to a first input of an AudioSwitch node or switcher or mixing stage 28. A third decoder 23 provides a decoded '1 (centre)' signal via an AudioSource node or interface 26 to a second input of AudioSwitch node 28. The decoders may each include at the input an internal or external decoding buffer. The output signal from AudioSwitch node 28 having a '2.0 stereo' format is passed via a Sound2D node or interface 29 to the input of a presenter or reproduction stage 20.

AudioMix node 27 and Audio switch node 28 are controlled by a control unit or stage 278 that retrieves and/or evaluates from the bitstream received from a content provider or broadcaster e.g. channel configuration data and other data required in the nodes, and feeds these data items to the nodes.

A new audio node, called AudioChannelConfig node 30 is introduced between AudioSwitch node 28 and Sound2D node 29. This node has the following properties or function:

```
AudioChannelConfig{
    exposedField   SFInt32    numChannel        0
    exposedField   MFInt32    phaseGroup        0
    exposedField   MFInt32    channelConfig     0
    exposedField   MFFloat    channelLocation   0,0
    exposedField   MFFloat    channelDirection  0,0
    exposedField   MFInt32    polarityPattern   1
},
```

expressed in the MPEG-4 notation. SFInt32, MFInt32 and MFFloat are single field (SF, containing a single value) and multiple field (MF, containing a multiple values and the quantity of values) data types that are defined in ISO/IEC 14772-1:1998, subclause 5.2. 'Int32' means an integer number and 'Float' a floating point number. 'exposedField' denotes a data field the content of which can be changed by the content provider or broadcaster per audio scene.

The phaseGroup (specifies phase relationships in the node output, i.e. specifies whether or not there are important phase relationships between multiple audio channels) and the numChannel (number of channels in the node output) fields are re-defined by the content provider due to the functional correlation with the channelConfig field or parameters.

The channelConfig field and the below channel configuration association table can be defined using a set of pre-defined index values, thereby using values from the ISO/IEC 14496-3:2001 audio part standard, chapter 1.6.3.4. According to the invention, it is extended using some values of chapter 0.2.3.2 of the MPEG-2 audio standard ISO/IEC 13818-3:

TABLE 1

Channel configuration association

| index value | No. of channels | audio syntactic elements, listed in order received | Channel to speaker mapping |
|---|---|---|---|
| 0 | unspecified | unspecified | channelConfiguration from child node is passed through |
| 1 | — | Escape sequence | The channelLocation, channelDirection and polarityPattern fields are valid |
| 2 | 1 | single_channel_element | centre front speaker |
| 3 | 2 | channel_pair_element | left, right front speakers |
| 4 | 3 | single_channel_element, channel_pair_element | centre front speaker, left, right front speakers |
| 5 | 4 | single_channel_element, channel_pair_element, single_channel_element | centre front speaker, left, right centre front speakers, rear surround speakers |
| 6 | 5 | single_channel_element, channel_pair_element, channel_pair_element | centre front speaker, left, right front speakers, left surround, right surround rear speakers |
| 7 | 5 + 1 | single_channel_element, channel_pair_element, channel_pair_element, lfe_element | centre front speaker, left, right front speakers, left surround, right surround rear speakers, front low frequency effects speaker |
| 8 | 7 + 1 | single_channel_element, channel_pair_element, channel_pair_element, channel_pair_element, lfe_element | centre front speaker, left, right centre front speakers, left, right outside front speakers, left surround, right surround rear speakers, front low frequency effects speaker |
| 9 | 2/2 | MPEG-2 L, R, LS, RS | left, right front speakers, left surround, right surround rear speakers |
| 10 | 2/1 | MPEG-2 L, R, S | left, right front speakers, rear surround speaker |
| . . . | | | |

Advantageously, an escape value '1' is defined in this table having e.g. index '1', in the table. If this value occurs, the desired channel configuration is not listed in the table and therefore the values in the channelLocation, channelDirection and polarityPattern fields are to be used for assigning the desired channels and their properties. If the channelConfig index is an index defined in the table, the channelLocation, channelDirection and polarityPattern fields are vectors of the length zero.

In the channelLocation and channelDirection fields a 3D-float vector array can be defined, whereby the first 3 float values (three-dimensional vector) are associated with the first channel, the next 3 float values are associated with the second channel, and so on.

The values are defined as x,y,z values (right handed coordinate system as used in ISO/IEC 14772-1 (VRML 97)). The channelLocation values describe the direction and the absolute distance in meter (the absolute distance has been used because simply the user can generate a normalised vector, as usually used in channel configuration). The channelDirection is a unit vector with the same coordinate system. E.g. channelLocation [0, 0, −1] relative to the listening sweet spot means centre speaker in one-meter distance. Three other examples are given in the three lines of table 2:

TABLE 2

Examples for channelLocation and channelDirection

| channelLocation | | | channelDirection | | | |
|---|---|---|---|---|---|---|
| X | Y | Z | X | Y | Z | Location |
| 0 | 0 | −1 | 0 | 0 | 1 | center front speaker |
| k * sin(30°) | 0 | k * −cos(60°) | −sin(30°) | 0 | cos(60°) | right front speaker |
| k * −sin(45°) | k * sin(45°) | k * −cos(45°) | sin(45°) | −sin(45°) | cos(45°) | Ambisonic Cube (LFU) Left Front Up |

The polarityPattern is an integer vector where the values are restricted to the values given in table 3. This is useful for example in case of Dolby ProLogic sound where the front channels have monopole pattern and the surround channel have dipole characteristic.

The polarityPattern can have values according to table 2.

TABLE 1

| polarityPattern association | |
|---|---|
| Value | Characteristics |
| 0 | Monopole |
| 1 | Dipole |
| 3 | Cardioide |
| 4 | Headphone |
| . . . | . . . |

In an alternative embodiment of the invention, the additional AudioChannelConfig node 30 is not inserted. Instead, the functionality of this node is added to nodes of the type AudioMix 27, AudioSwitch 28 and AudioFX (not depicted).

In an further alternative embodiment of the invention, the above values of the phaseGroup fields are additionally defined for the corresponding existing nodes AudioMix, AudioSwitch and AudioFX in the first version ISO/IEC 14496 of the MPEG-4 standard. This is a partial solution whereby the values for the phase groups are taken from above table 1 except the escape sequence. Higher values are reserved for private or future use. For example, channels having the phaseGroup 2 are identified as left/right front speakers.

The invention claimed is:

1. Method for processing two or more decoded but not yet combined individual audio signals received or replayed from different audio sources, wherein at least two of said decoded audio signals have a different number of channels per decoded audio signal and different channel configurations for channel to speaker mapping, and wherein said decoded audio signals are to be combined by mixing and/or switching before being presented in a final channel configuration, and wherein to each one of said decoded audio signals a corresponding specific channel configuration information item representing corresponding number of channels and channel configuration for said each decoded audio signal is attached and the channel configuration information items for said two or more decoded audio signals can represent conflicting numbers of channels per decoded audio signal and conflicting channel configurations, said method comprising:

controlling said mixing and/or switching such that in case of conflicting numbers of channels and conflicting channel configurations the number of the channels and the configuration of the channels to be output following said mixing and/or following said switching is determined by specific mixing and/or switching information provided from a content provider or broadcaster that is embedded in at least one of said audio signals, so as to resolve such conflict, and attaching to the combined data stream to be presented a correspondingly updated channel configuration information item, wherein said correspondingly updated channel configuration information item represents said determined number of channels and configuration.

2. Method according to claim 1, wherein said bitstream has MPEG-4 format.

* * * * *